United States Patent
Tsugimura

(10) Patent No.: US 10,521,686 B2
(45) Date of Patent: Dec. 31, 2019

(54) IMAGE PROCESSING APPARATUS, INFORMATION PROCESSING METHOD AND STORAGE MEDIUM FOR GENERATING AN IMAGE FILE BY EXTRACTING CHARACTER PIXELS OF A TARGET IMAGE

(71) Applicant: BROTHER KOGYO KABUSHIKI KAISHA, Nagoya-shi Aichi-ken (JP)

(72) Inventor: Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 220 days.

(21) Appl. No.: 15/418,089

(22) Filed: Jan. 27, 2017

(65) Prior Publication Data

US 2017/0220888 A1     Aug. 3, 2017

(30) Foreign Application Priority Data

Jan. 28, 2016    (JP) .................................. 2016-014861

(51) Int. Cl.
  *G06K 9/34* (2006.01)
  *G06K 9/00* (2006.01)
  *G06K 9/46* (2006.01)

(52) U.S. Cl.
  CPC ......... *G06K 9/344* (2013.01); *G06K 9/00463* (2013.01); *G06K 9/4647* (2013.01); *G06K 2209/01* (2013.01)

(58) Field of Classification Search
  None
  See application file for complete search history.

(56) References Cited

U.S. PATENT DOCUMENTS

| 5,999,647 A * | 12/1999 | Nakao | G06K 9/00463 382/177 |
| 7,925,098 B2 * | 4/2011 | Tamura | H04N 19/176 345/555 |
| 2004/0114804 A1 | 6/2004 | Tanioka | |

(Continued)

FOREIGN PATENT DOCUMENTS

| JP | H05-225378 A | 9/1993 |
| JP | H09-330378 A | 12/1997 |

(Continued)

*Primary Examiner* — Andrae S Allison
(74) *Attorney, Agent, or Firm* — Scully, Scott, Murphy & Presser, PC

(57) ABSTRACT

An image processing apparatus including: a processor; and memory storing computer-readable instructions therein, the computer-readable instructions, when executed by the processor, causing the image processing apparatus to perform: acquiring target image data configured by a plurality of pixels and representing a target image including a character; acquiring a character code corresponding to the character in the target image; acquiring an index value relating to a number of a plurality of character pixels configuring the character in the target image by using the character code corresponding to the character in the target image; determining a first extraction condition by using the index value; and extracting the plurality of character pixels satisfying the first extraction condition from the plurality of pixels in the target image.

16 Claims, 8 Drawing Sheets

(56) References Cited

U.S. PATENT DOCUMENTS

| | | | | |
|---|---|---|---|---|
| 2011/0255777 A1* | 10/2011 | Matsuoka | .......... | H04N 1/40062 382/164 |
| 2013/0148177 A1* | 6/2013 | Kuraya | ............. | H04N 1/00013 358/505 |
| 2013/0235087 A1* | 9/2013 | Kashibuchi | ............. | G06T 11/60 345/660 |
| 2013/0257892 A1* | 10/2013 | Ozawa | ................. | G06T 11/001 345/589 |
| 2015/0113474 A1* | 4/2015 | Gallup | ................. | G06F 3/0485 715/784 |
| 2016/0211863 A1* | 7/2016 | Kataoka | ............. | H03M 7/3084 |

FOREIGN PATENT DOCUMENTS

| | | |
|---|---|---|
| JP | H10-116317 A | 5/1998 |
| JP | 2001-134026 A | 5/2001 |
| JP | 2002-288589 A | 10/2002 |
| JP | 2009-032223 A | 2/2009 |
| JP | 2013-211750 A | 10/2013 |

* cited by examiner

IMAGE PROCESSING APPARATUS, INFORMATION PROCESSING METHOD AND STORAGE MEDIUM FOR GENERATING AN IMAGE FILE BY EXTRACTING CHARACTER PIXELS OF A TARGET IMAGE

CROSS-REFERENCE TO RELATED APPLICATIONS

This application claims priority from Japanese Patent Application No. 2016-014861 filed on Jan. 28, 2016, the entire contents of which are incorporated herein by reference.

TECHNICAL FIELD

Aspects of the disclosure relates to image processing using image data representing an image including a character.

BACKGROUND

A technology of appropriately extracting character pixels configuring a character by using target image data representing a target image including the character is needed. For example, binary data indicative of the extracted character pixels can be efficiently used for compression of the target image data, specifically, for generation of a so-called highly compressed PDF file. In this technology, binary data indicative of character pixels are generated using a character color value, a background color value and a feature value relating to sharpness of a character in a target image.

However, according to the above technology, since information to be considered for extraction of the character pixels is not sufficient, there is a possibility that the character pixels cannot be extracted with high precision.

SUMMARY

Aspects of the disclosure provide a novel technology capable of extracting character pixels in a target image with precision by using target image data.

According to an aspect of the disclosure, there is provided an image processing apparatus including: a processor; and a memory storing computer-readable instructions therein, the computer-readable instructions, when executed by the processor, causing the image processing apparatus to perform: acquiring target image data configured by a plurality of pixels and representing a target image including a character; acquiring a character code corresponding to the character in the target image; acquiring an index value relating to a number of a plurality of character pixels configuring the character in the target image by using the character code corresponding to the character in the target image; determining a first extraction condition by using the index value; and extracting the plurality of character pixels satisfying the first extraction condition from the plurality of pixels in the target image.

In the meantime, the technology in the disclosure can be implemented in a variety of forms. For example, the technology can be implemented in forms such as the image processing apparatus, an image reading apparatus, a complex machine, a control method thereof, a computer program for implementing functions of the apparatuses or method, a storage medium having the computer program stored therein, and the like.

DETAILED DESCRIPTION

A. Illustrative Embodiment

Figure 1:
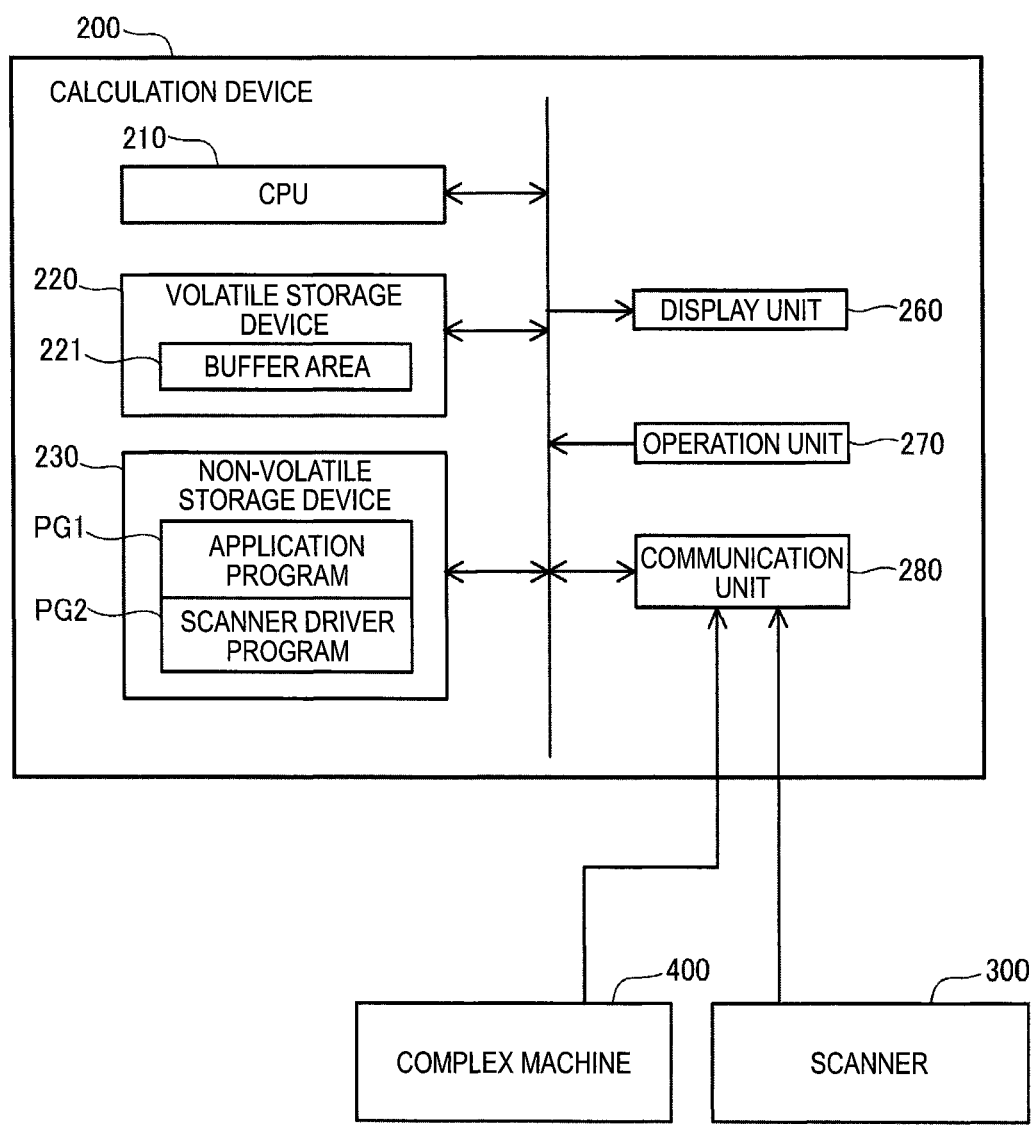
FIG. 1 is a block diagram depicting a configuration of a calculation device 200.

A-1. Configuration of Image Processing Apparatus:

Hereinafter, the disclosure will be described with reference to an illustrative embodiment. FIG. 1 is a block diagram depicting a configuration of a calculation device 200 serving as an image processing apparatus, in the illustrative embodiment.

The calculation device 200 is a terminal device such as a PC, a smart phone or the like, for example. The calculation device 200 has a CPU 210 serving as a controller of the calculation device 200, a volatile storage device 220 such as a RAM, a non-volatile storage device 230 such as a hard disk drive, a display unit 260 such as a liquid crystal monitor, an operation unit 270 such as a mouse, a keyboard and the like, and a communication unit 280. The calculation device 200 is connected in communication with an external apparatus such as a scanner 300 and a complex machine 400 via the communication unit 280.

The volatile storage device 220 provides a buffer area 221 configured to temporarily store therein a variety of intermediate data, which is to be generated when the CPU 210 performs processing. In the non-volatile storage device 230, an application program PG1 and a scanner drive program PG2 are stored. The application program PG1 is a computer program for implementing an application configured to manage and use a device, for example, the complex machine 400 and the scanner 300 and is configured to implement image processing, which will be described later, as a part of the application, for example. The scanner drive program PG2 is a computer program for implementing a scanner driver for controlling a scan function of the complex machine 400 and the scanner 300. The computer programs PG1, PG2 are provided through a download from a server, for example. Instead, the computer programs PG1, PG2 may be provided with being stored in a DVD-ROM or the like.

The calculation device 200 is connected in communication with the scanner 300 and the complex machine 400, which are external devices, via the communication unit 280. The scanner 300 is an image reading apparatus configured to optically read a document and to generate scan data. The complex machine 400 includes an image reading unit (not shown) configured to optically read a document and to generate scan data and a printing execution unit (not shown) configured to print an image on a printing medium such as a sheet by a predetermined method (for example, inkjet or laser).

The CPU 210 is configured to execute the application program PG1, thereby executing the image processing to be described later.

Figure 2:
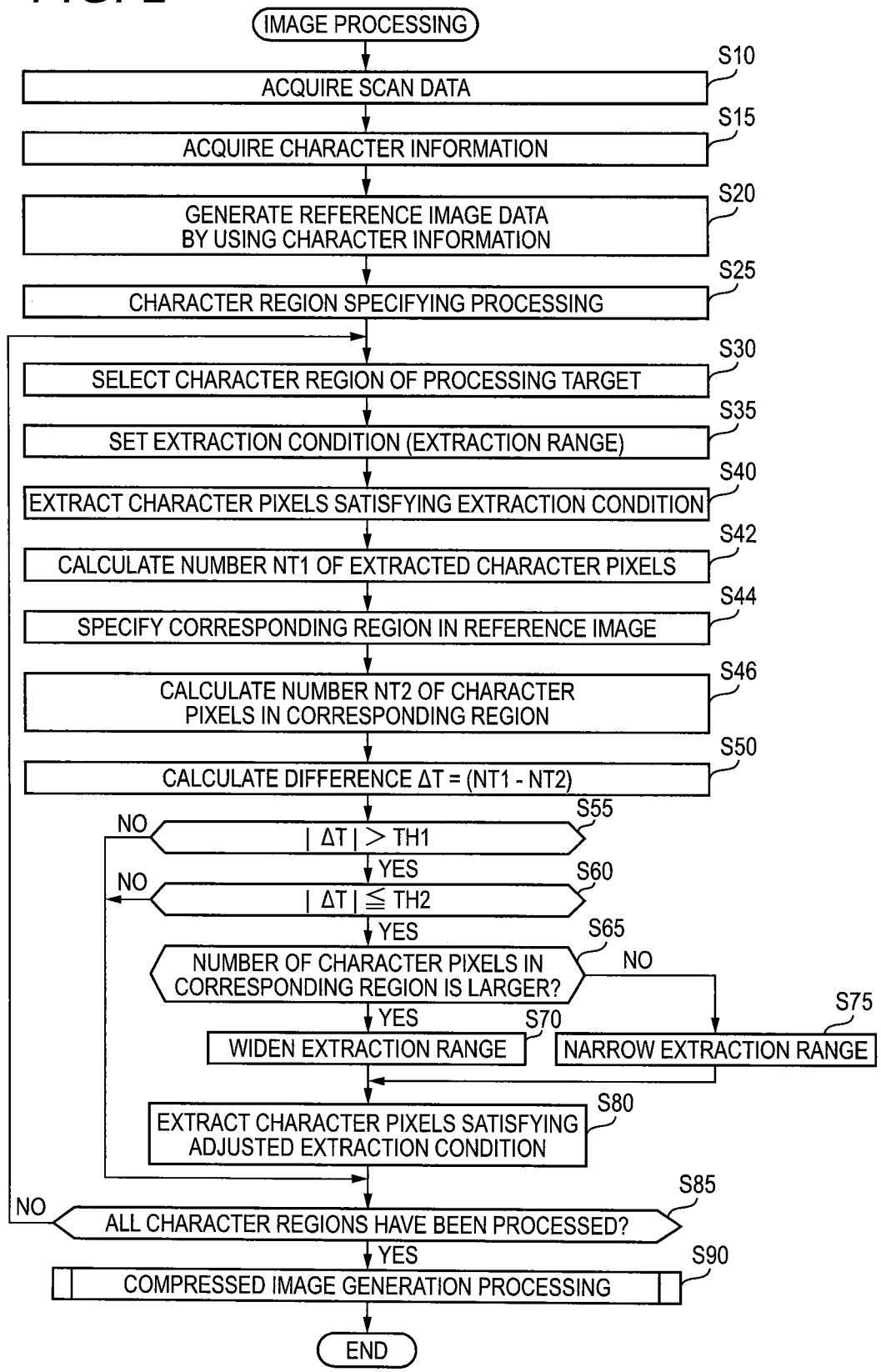
FIG. 2 is a flowchart of image processing.

A-2. Image Processing:

FIG. 2 is a flowchart of image processing. The image processing is processing of generating scan data indicative of a scan image by optically reading a document and generating a highly compressed PDF file indicative of a scan image by using the scan data. The image processing is executed in a case where a document reading instruction in which a highly compressed PDF file is designated as a storage format is input from a user to the calculation device 200 via the operation unit 270. The highly compressed PDF file is a PDF image file including compressed character image data representing a character image and compressed background image data representing a background image and configured to represent one image by the plurality of image data.

In S10, the CPU 210 acquires scan data as target image data. Specifically, the CPU 210 activates the scanner drive program PG2 to execute a function as the scanner driver. Thereby, the CPU 210 controls the scanner 300 or the image reading unit of the complex machine 400 to optically read a document prepared by the user, thereby acquiring scan data. The scan data is bitmap data consisting of a plurality of pixels, specifically, RGB image data representing a color of each pixel by RGB values. RGB values of one pixel include gradation values (hereinafter, referred to as component values) of three color components of red (R), green (G) and blue (B). In the illustrative embodiment, the number of gradations of each component value is 256 gradations.

Meanwhile, in a modified embodiment, the CPU 210 may be configured to acquire scan data generated in advance and stored in a storage device such as the non-volatile storage device 230, from the storage device.

Figure 3A:
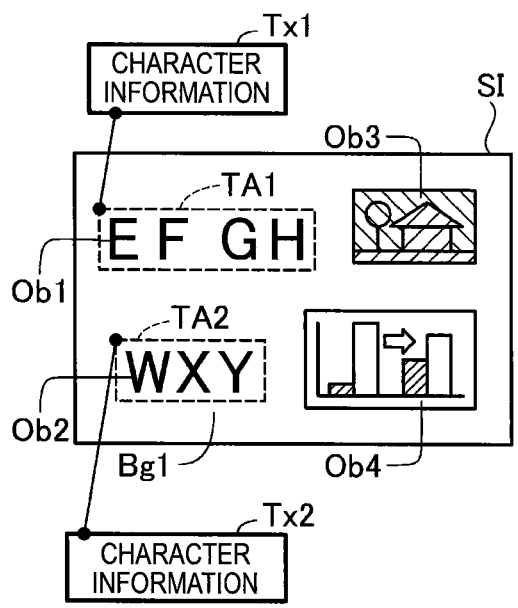
FIGS. 3A to 3E depict example of images used in the image processing.

FIGS. 3A to 3E depict examples of images that is to be used in the image processing. FIG. 3A depicts an example of a scan image SI represented by the scan data, i.e., a scan image SI as the target image of the illustrative embodiment. In the scan image SI, a plurality of pixels (not shown) is arranged in a matrix shape along horizontal and vertical directions.

The scan image SI includes a background Bg1 and a plurality of objects Ob1 to Ob4. The objects Ob1, Ob2 are characters. The object Ob3 is a photograph and the object Ob4 is a drawing. The drawing is an object representing an illustration, a table, a line diagram, a pattern or the like.

In S15, the CPU 210 acquires character information Tx1, Tx2 (FIG. 3A) corresponding to the characters Ob1, Ob2 in the scan image SI. Specifically, the CPU 210 executes character identifying processing, which is used in the well-known OCR (Optical Character Recognition) technology, for the scan data, thereby generating the character information Tx1, Tx2.

The character information Tx1 includes at least a character code indicative of the corresponding character Ob1. The character code is identification information (specifically, a numerical value) allotted to a character or a symbol so as to handle the character or symbol in a computer, and is "Unicode", for example. Meanwhile, in the illustrative embodiment, the character information Tx1 further includes information relating to a character other than the character code, for example size information indicative of a size of the corresponding character Ob1 and font information indicative of a font of the corresponding character Ob1. Also, the character information Tx1 includes coordinate information indicative of a position of a character region TA1, in which the character Ob1 is arranged, in the scan image SI. By the coordinate information, the character information Tx1 is associated with the character Ob1 in the scan image SI. This also applies to the character information Tx2 corresponding to the character Ob2 (character region TA2).

In S20, the CPU 210 generates reference image data indicative of a character image (also referred to as reference image RI) by using the character information Tx1, Tx2. Specifically, the characters included in the generated reference image RI are the characters indicated by the character codes included in the character information Tx1, Tx2, and have sizes indicated by the size information included in the character information Tx1, Tx2. Also, the characters included in the reference image RI are the characters of the fonts indicated by the font information included in the character information Tx1, Tx2 and are arranged at positions in the reference image RI indicated by the coordinate information included in the character information Tx1, Tx2. The reference image data can also be referred to as bitmap data obtained by rasterizing the character information Tx1, Tx2. In the meantime, the reference image data is generated using the character information Tx1, Tx2, without using the scan data.

Figure 3B:
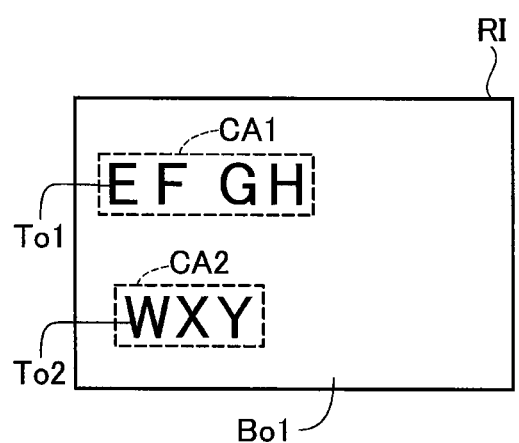

FIG. 3B depicts an example of the reference image RI indicated by the reference image data. The reference image RI is an image having the same size as the scan image SI, i.e., an image configured by pixels having the same number of horizontal and vertical pixels as the scan image SI. The reference image RI is a character image corresponding to the characters Ob1, Ob2 in the scan image SI. That is, the reference image RI includes a character To1 generated using the character information Tx1 corresponding to the character Ob1 in the scan image SI, a character To2 generated using the character information Tx2 corresponding to the character Ob2 in the scan image SI, and a background Bo1. The reference image RI is a binary image including a plurality of character pixels configuring the characters To1, To2 and a plurality of background pixels configuring the background Bo1.

Figure 3C:
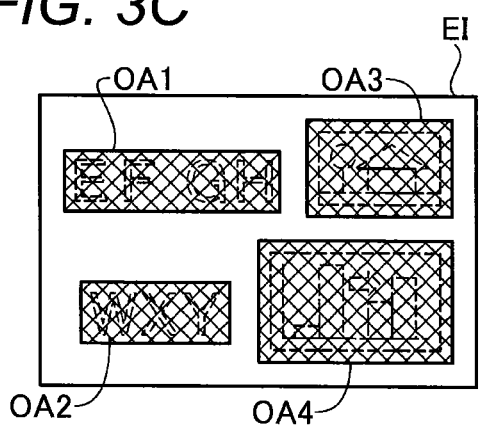

In S25, the CPU 210 executes character region specifying processing for specifying one or more character regions including characters in the scan image SI by using the scan data. Specifically, the CPU 210 generates edge image data representing an edge image EI (FIG. 3C) by applying an edge detection filter such as a sobel filter or the like to the scan data. The CPU 210 specifies a region in the edge image EI in which an edge strength is greater than a reference value, and specifies a region in the scan image SI, corresponding to the specified region in the edge image EI, as an object region. In the example of FIG. 3C, four object regions OA1 to OA4 corresponding to the four objects Ob1 to Ob4 in the scan image SI are specified in the edge image EI. The specifying of the four object regions OA1 to OA4 in the edge image EI is the same as the specifying of the four object regions in the scan image SI. The CPU 210 determines whether each object region is a character region, based on a color distribution of each object region in the scan image SI. Specifically, the CPU 210 calculates a number of types C (a number of colors C) of brightness values included in an object region by using a brightness histogram of the object region. The CPU 210 classifies the plurality of pixels included in the object region into non-object pixels having a color approximate to a color around the object region (background color) and object pixels other than the non-object pixels, and calculates a ratio D (pixel density D) of the object pixels to the number of the background pixels. A character has a tendency that it has the number of colors C and the pixel density D smaller than those of an object other than the character. For example, in a case where the number of colors C in an object region of a determination target is smaller than a first threshold value and the pixel density D of the determination target is smaller than a second threshold value, the CPU 210 determines that the object region is a character region.

Here, a variety of well-known methods can be adopted as the method of specifying a character region. The well-known methods are disclosed in JP-A-H05-225378 and JP-A-2002-288589, for example.

In the example of FIG. 3A, the character regions TA1, TA2 corresponding to the characters Ob1, Ob2 are specified in the scan image SI.

In S30 to S85, the CPU 210 executes a series of processing for extracting the plurality of character pixels configuring the characters, for each of the specified character regions.

In S30, the CPU 210 selects one character region as a processing target from the plurality of character regions specified in the scan image SI. In the example of FIG. 3A, one character region is selected one by one from the specified character regions TA1, TA2.

In S35, the CPU 210 sets an extraction condition for extracting the plurality of character pixels in the character region of the processing target. Specifically, the CPU 210 sets a range of RGB values of character pixels which should be extracted (hereinafter, referred to as extraction range).

Figure 4A:
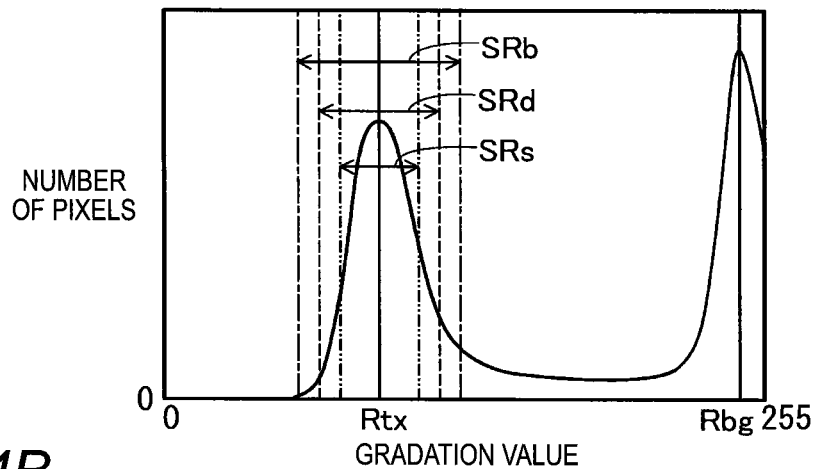
FIGS. 4A to 4C illustrate setting of an extraction range.
Figure 4B:
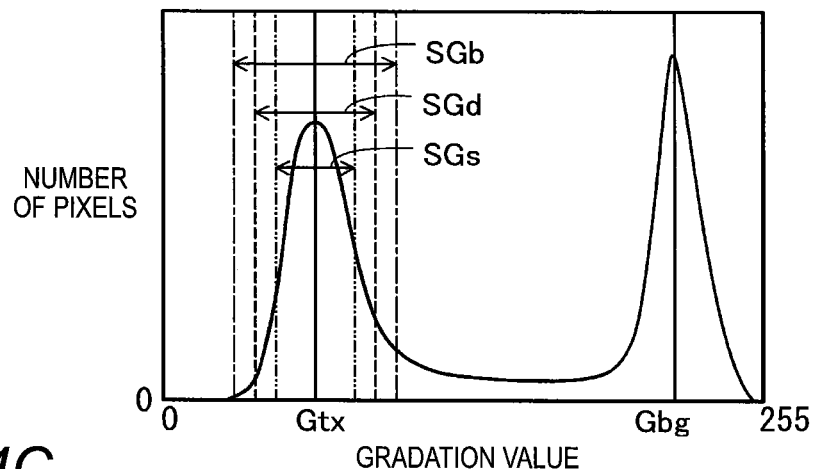
Figure 4C:
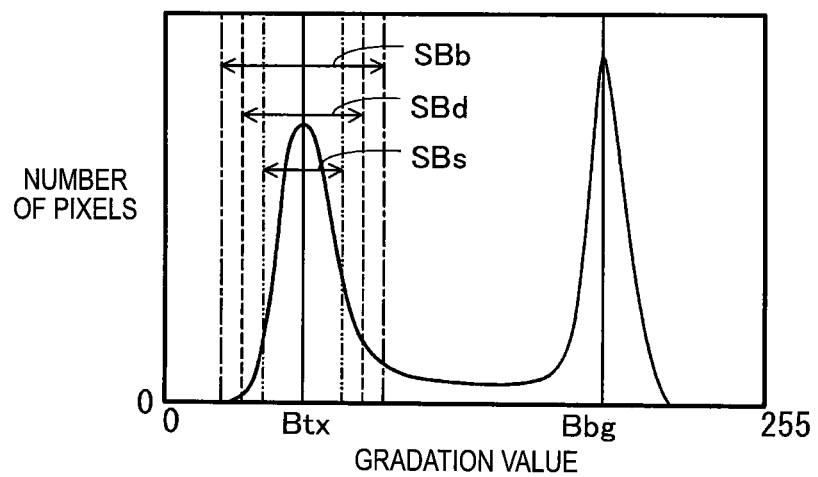

FIGS. 4A to 4C illustrate the setting of the extraction range. The CPU 210 generates histograms of respective component values of RGB of the character region of the processing target. For example, the histogram (FIG. 4A) of an R component of one character region of the processing target selected in S30 from the character regions TA1, TA2 is generated by classifying respective pixels in the character region into a plurality of classes in correspondence to R component values of respective pixels. In the illustrative embodiment, the histogram is generated by setting each of gradation values of 256 gradations, which can be taken as the R component value, as one class. This also applies to the histograms of G and B components shown in FIGS. 4B and 4C.

The histogram of each component includes a peak corresponding to a background and a peak corresponding to a character. The peak corresponding to the background is a peak corresponding to a mode of the component, i.e., a highest peak in the histogram, for example. The peak corresponding to the character is a second highest peak, for example. In the histograms of R, G and B components shown in FIGS. 4A to 4C, the peaks corresponding to the background are respectively peaks located at positions of values Rbg, Gbg, Bbg, and the peaks corresponding to the character are peaks located at positions of values Rtx, Gtx, Btx. The RGB values Rtx, Gtx, Btx corresponding to the peaks corresponding to the character are character color values indicative of a color of the character, and the RGB values Rbg, Gbg, Bbg corresponding to the peaks corresponding to the background are background color values indicative of a color of the background.

The CPU 210 specifies the character color values Rtx, Gtx, Btx by using the histograms, and sets the extraction ranges based on the character color values Rtx, Gtx, Btx. Specifically, a range having a predetermined default width in which each component value of the character color value is a center is set as the extraction range of each component. For example, in the examples of FIGS. 4A to 4C, an R component range SRd, a G component range SGd, and a B component range SBd are set. In the meantime, since the setting of the ranges SRd, SGd, SBd is to set threshold values indicative of upper and lower limits of the ranges, it can be said that the setting of the ranges SRd, SGd, SBd is to set threshold values for extracting the character pixels.

The extraction ranges are set, so that a condition that a pixel has values included in the extraction ranges is set as the extraction condition of character pixels. More specifically, the ranges SRd, SGd, SBd are set, so that a condition that a pixel has RGB values including an R component value in the R component range SRd, a G component value in the G component range SGd and a B component value in the B component range SBd is set as the extraction condition of character pixels. In the meantime, the extraction condition set in S35 is also referred to as a default extraction condition.

In S40, the CPU 210 extracts character pixels satisfying the default extraction condition. Specifically, the CPU 210 executes binarization processing of classifying pixels, which satisfy the extraction condition set in S35, of the plurality of pixels in the character region of the processing target as character pixels, and pixels, which do not satisfy the extraction condition, as background pixels.

Figure 5A:
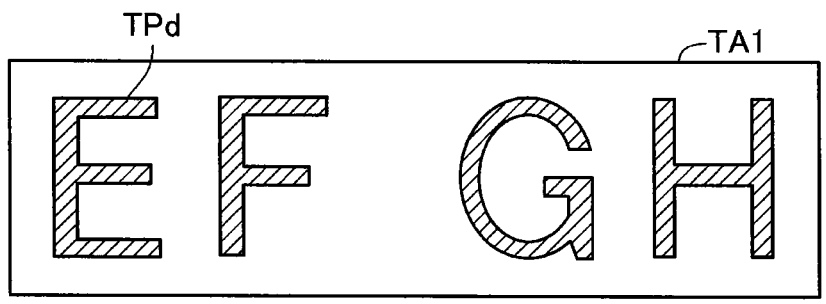
FIGS. 5A to 5C depict an example of an extraction result of character pixels.
Figure 5B:
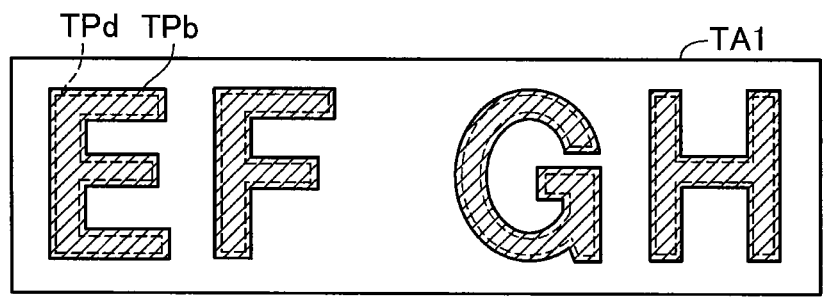
Figure 5C:
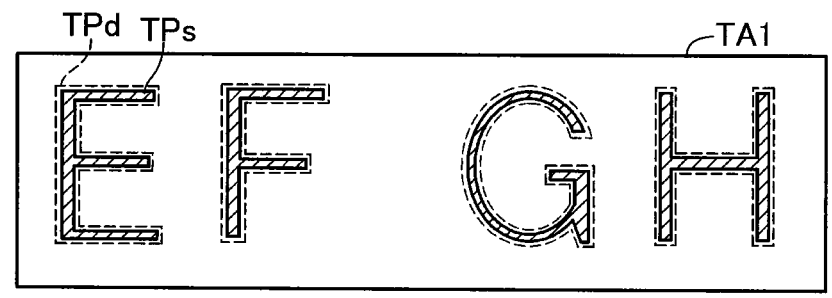

FIGS. 5A to 5C depict examples of an extraction result of the character pixels. FIG. 5A depicts character pixels TPd extracted using the default extraction condition in the character region TA1 in a case where the character region TA1 of FIG. 3A is the character region of the processing target.

In S42, the CPU 210 calculates a number NT1 of the character pixels extracted in the character region of the processing target.

In S44, the CPU 210 specifies a corresponding region in the reference image RI, which corresponds to the character region of the processing target. Herein, the corresponding region corresponding to the character region is a region in the reference image RI overlapping with the character region in the scan image SI in a case where the scan image SI and the reference image RI having the same size are superimposed so that four sides thereof overlap with each other. For example, in a case where the character region TA1 of FIG. 3A is the character region of the processing target, a region CA1 of FIG. 3B is specified as a corresponding region. The character region in the scan image SI and the corresponding region in the reference image RI, which corresponds to the character region, are regions having the same size and the same number of pixels.

In S46, the CPU 210 calculates a number NT2 of the character pixels in the corresponding region in the reference image RI.

In S50, the CPU 210 calculates a difference $\Delta T$ of the numbers of the character pixels between the two regions, i.e., a difference $\Delta T$ between the number NT1 of the character pixels in the character region of the processing target and the number NT2 of the character pixels in the corresponding region ($\Delta T = (NT1-NT2)$).

In S55, the CPU 210 determines whether an absolute value of the difference $\Delta T$ is larger than a first reference value TH1. As the first reference value TH1, a number of a first ratio of the total number of pixels in the character region of the processing target is used, for example. In the illustrative embodiment, the first ratio is 10%.

In a case where the absolute value of the difference $\Delta T$ is larger than the first reference value TH1 (S55: YES), the CPU 210 determines in S60 whether the absolute value of the difference $\Delta T$ is equal to or smaller than a second reference value TH2. As the second reference value TH2, a number of a second ratio of the total number of pixels in the character region of the processing target is used, for example. The second ratio is larger than the first ratio. In the illustrative embodiment, the second ratio is 30%.

In a case where the absolute value of the difference ΔT is equal to or smaller than the second reference value TH2 (S60: YES), the default extraction condition of the character pixels is adjusted in S65 to S75. The default extraction condition is adjusted so that the number NT1 of the character pixels satisfying the extraction condition comes closer to the number NT2 of the character pixels in the corresponding region.

In S65, the CPU 210 determines whether the number NT2 of the character pixels in the corresponding region is larger than the number NT1 of the character pixels in the character region of the processing target.

It can be assumed that in a case where the number NT2 of the character pixels in the corresponding region is larger than the number NT1 of the character pixels in the character region of the processing target (S65: YES), the number NT1 of the character pixels in the character region of the processing target is excessively smaller than the number of appropriate character pixels which should be extracted. For this reason, in this case, the default extraction condition is adjusted so that the number NT1 of the character pixels satisfying the extraction condition increases. Specifically, in S70, the CPU 210 widens the extraction ranges set in S35. More specifically, the extraction ranges are changed from the R, G and B component ranges SRd, SGd, SBd of FIGS. 4A to 4C to wider ranges SRb, SGb, SBb. As shown in FIGS. 4A to 4C, the changed ranges SRb, SGb, SBb are ranges having widths wider than the default widths, in which values of respective components of the character color values Rtx, Gtx, Btx are centers.

It can be assumed that in a case where the number NT2 of the character pixels in the corresponding region is equal to or smaller than the number NT1 of the character pixels in the character region of the processing target (S65: NO), the number NT1 of the character pixels in the character region of the processing target is excessively larger than the number of appropriate character pixels which should be extracted. For this reason, in this case, the default extraction condition is adjusted so that the number NT1 of the character pixels satisfying the extraction condition decreases. Specifically, in S75, the CPU 210 narrows the extraction ranges set in S35. More specifically, the extraction ranges are changed from the R, G and B component ranges SRd, SGd, SBd of FIGS. 4A to 4C to narrower ranges SRs, SGs, SBs. As shown in FIGS. 4A to 4C, the changed ranges SRs, SGs, SBs are ranges having widths narrower than the default widths, in which values of respective components of the character color values Rtx, Gtx, Btx are centers.

In S80, the CPU 210 extracts character pixels satisfying the adjusted extraction condition. Specifically, the CPU 210 executes binarization processing of classifying the plurality of pixels in the character region of the processing target. Specifically, pixels which satisfy the extraction condition adjusted in S70 or S75 are classified as character pixels, and pixels which do not satisfy the adjusted extraction condition are classified as background pixels. The character pixels extracted using the adjusted extraction condition are character pixels that are to be finally extracted in the character region of the processing target.

FIG. 5B depicts character pixels TPb extracted using the adjusted extraction condition in the character region TA1 in a case where the default extraction condition is adjusted by widening the extraction ranges. FIG. 5C depicts character pixels TPs extracted using the adjusted extraction condition in the character region TA1 in a case where the default extraction condition is adjusted by narrowing the extraction ranges. In FIGS. 5B and 5C, the character pixels TPd extracted using the default extraction condition (FIG. 5A) are shown by broken lines for comparison.

In FIG. 5B, the character expressed by the character pixels TPb extracted using the adjusted extraction condition is thicker than the character pixels TPd extracted using the default extraction condition. In this way, it can be seen from FIG. 5B that the number of the character pixels TPb has increased from the number of the character pixels TPd. In FIG. 5C, the character expressed by the character pixels TPs extracted using the adjusted extraction condition is thinner than the character pixels TPd extracted using the default extraction condition. In this way, it can be seen from FIG. 5C that the number of the character pixels TPs has decreased from the number of the character pixels TPd.

In a case where the absolute value of the difference ΔT is equal to or smaller than the first reference value TH1 (S55: NO), the processing of S70 to S80 is skipped. That is, in this case, the character pixels extracted using the default extraction condition in S40 become character pixels to be finally extracted. In this case, it is assumed that since the absolute value of the difference ΔT is relatively small, the number NT1 of the character pixels extracted using the default extraction condition is appropriate.

Also in a case where the absolute value of the difference ΔT is larger than the second reference value TH2 (S60: NO), the processing of S70 to S80 is skipped and the character pixels extracted using the default extraction condition in S40 become character pixels to be finally extracted. In this way, in a case where the absolute value of the difference ΔT is excessively large, there is a high possibility that the acquired character code does not indicate an actual character due to erroneous character recognition in S15, for example, and thus the number NT2 of the character pixels in the corresponding region in the reference image RI will be an abnormal value. It can be assumed that in a case where the number NT2 of the character pixels in the corresponding region in the reference image RI is an abnormal value, it is not possible to adjust the number of character pixels to be extracted to an appropriate value by the adjustment of the extraction condition. For this reason, it is assumed that it is preferable to skip over the processing of S70 to S80.

Figure 3D:
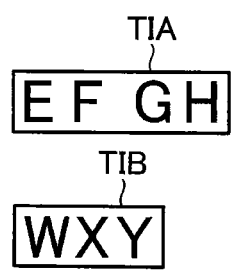

In this way, as the processing of S35 to S80 is executed for one character region, which is the processing target, character binary data indicative of the character pixels extracted in the character region of the processing target is generated. The character binary data is binary data having the character pixels as "ON" pixels and the background pixels as "OFF" pixels. FIG. 3D depicts binary images TIA, TIB indicated by the character binary data corresponding to the character regions TA1, TA2 (FIG. 3A) of the scan image SI.

In S85, the CPU 210 determines whether all the character regions specified in S25 have been processed. In a case where there is a character region that has not been processed yet (S85: NO), the CPU 210 returns to S30. In a case where all the character regions have been processed (S85: YES), the CPU 210 proceeds to S90.

Figure 6:
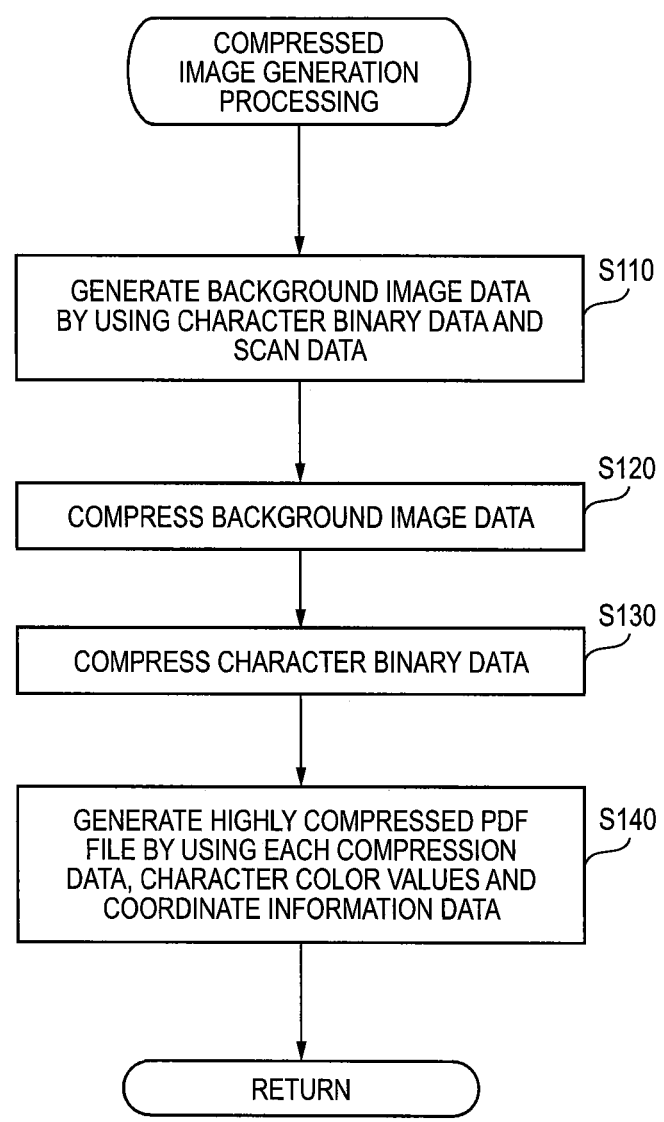
FIG. 6 is a flowchart of compressed image generation processing.

In S90, the CPU 210 executes compressed image generation processing of generating a highly compressed PDF file as an image file indicative of the scan image SI. FIG. 6 is a flowchart of the compressed image generation processing.

Figure 3E:
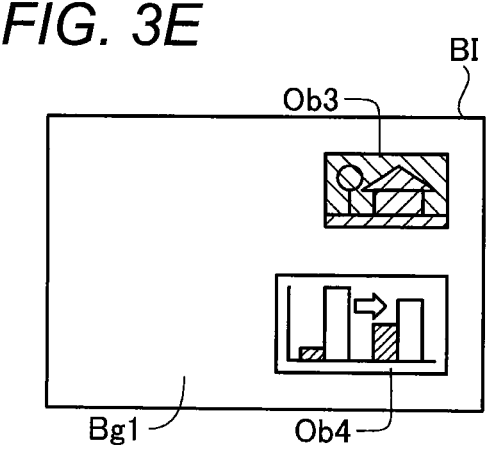

In S110, the CPU 210 generates background image data by using the character binary data and the scan data. Specifically, the CPU 210 replaces the values (RGB values) of the character pixels, which are specified by the character binary data, of the plurality of pixels included in the scan image SI indicated by the scan data with background color values. The background color values are values representing a color of the background Bg1 of the scan image SI, and are the RGB values (Rbg, Gbg, Bbg) corresponding to the peaks corresponding to the background Bg1, for example (refer to FIGS. 4A to 4C). As a result, background image data representing the background image BI in which the characters have been removed from the scan image SI is generated. In FIG. 3E, a background image BI corresponding to the scan image SI of FIG. 3A is shown. The background image BI does not include the removed characters Ob1, Ob2 and includes objects other than the characters, i.e., the photograph Ob3 and the drawing Ob4.

In S120, the CPU 210 compresses the generated background image data. The background image BI is a multi-gradation (for example, 256 gradations) image that does not include a character and can include a photograph or a drawing. The CPU 210 compresses the background image data by using a compression method suitable for compression of the multi-gradation image, specifically, a JPEG (Joint Photographic Experts Group) compression method. Since the background image BI does not include a character, a high-frequency component is relatively small. As a result, a compression ratio upon the compression of the background image data by the JPEG compression is larger than a compression ratio upon compression of the original data (scan data).

In S130, the CPU 210 compresses the character binary data. For example, the two character binary data indicative of the binary images TIA, TIB shown in FIG. 3D is compressed. In a case where a resolution of a binary image indicative of a character is reduced, a jaggy shape of an edge is noticeable, so that the visibility is likely to be degraded. Thus, the CPU 210 compresses the character binary data by using a compression method suitable for the binary data, specifically, a compression method having a high compression ratio and capable of compressing the binary data without the reduction in the resolution, for example, FAXG3 or MMR (Modified Modified Read) compression. In this way, the background image data and the character binary data are respectively compressed by the different methods.

In S140, the CPU 210 generates a highly compressed PDF file IF by using the compressed background image data, the compressed character binary data, the character color values, the coordinate information and the character codes. The character color values are color values representing a color of a character in the binary image indicated by each character binary data, for example, RGB values (Rtx, Gtx, Btx) corresponding to the peaks corresponding to the character (refer to FIGS. 4A to 4C). The coordinate information is information indicative of a position of the binary image, which is indicated by the character binary data, in the background image. The character code is identification information indicative of each character in the binary image indicated by the character binary data and is acquired in S15 of FIG. 2. In a PDF, a standard is defined so that image data of a plurality of different formats is stored in one file and when reproducing the file, the image data can be reproduced as one image with being superimposed. The CPU 210 generates the highly compressed PDF file IF in accordance with the standard. As a result, the scan image SI including a character can be stored with a format in which the character is sharp and can be thus easily read and an amount of data is relatively small. Also, the character is associated with the corresponding character code. Thereby, for example, in a case where the highly compressed PDF file IF is displayed on a terminal apparatus by using a viewer program, it is possible to retrieve a position of a specific character in the displayed image.

Figure 7:
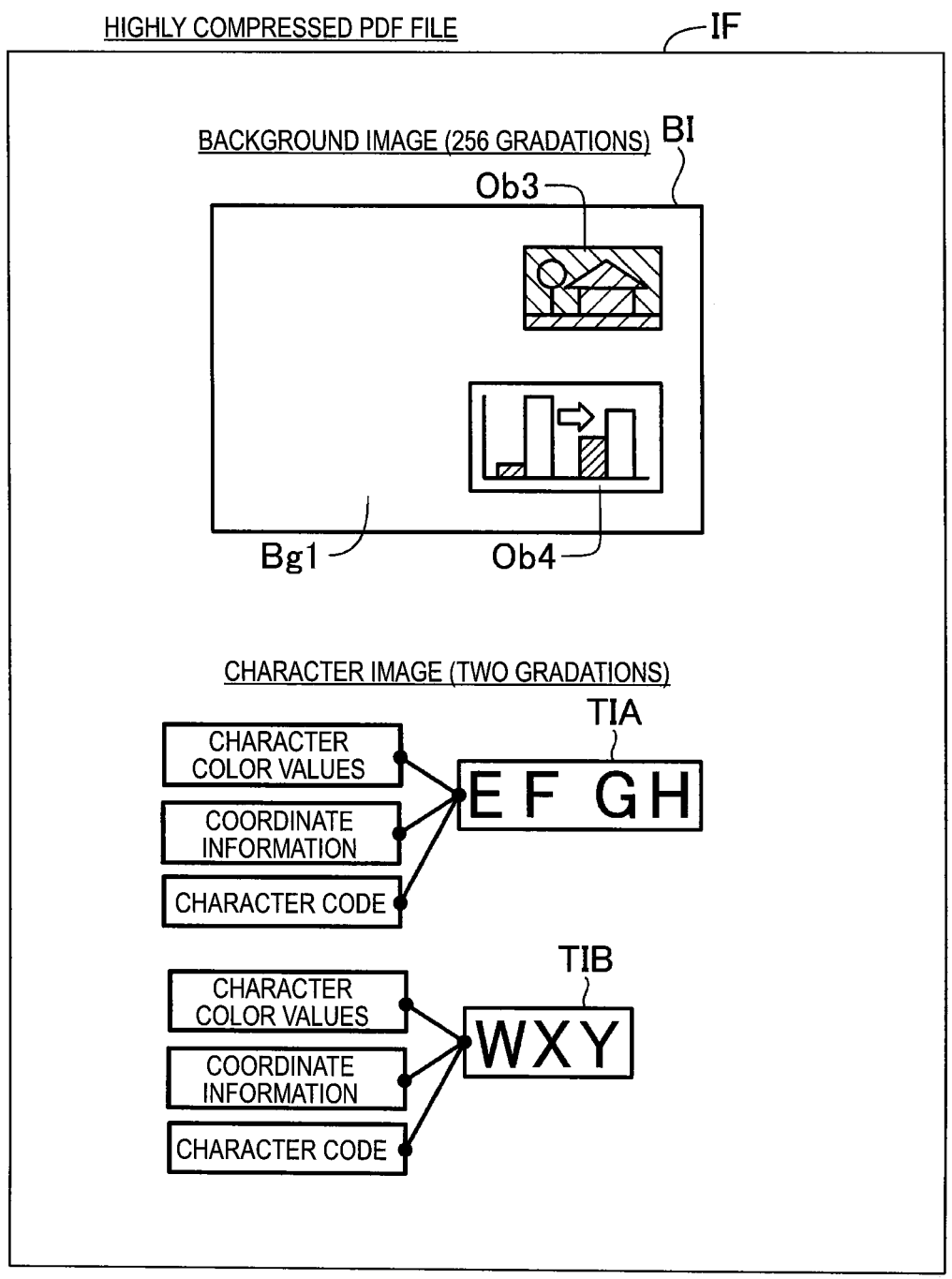
FIG. 7 conceptually depicts a highly compressed PDF file IF.

FIG. 7 conceptually depicts the highly compressed PDF file IF. The highly compressed PDF file IF is a highly compressed PDF file IF indicative of the scan image SI of FIG. 3A. As shown in FIG. 7, in one highly compressed PDF file IF, the compressed background image data indicative of the background image BI of FIG. 3E and the compressed character binary data indicative of the binary images TIA, TIB of FIG. 3D are stored. In the highly compressed PDF file IF, the character color values indicative of the colors of the characters in the binary images TIA, TIB, the coordinate information indicative of the positions of the binary images TIA, TIB in the background image BI, and the character codes indicative of the respective characters in the background images BI of the binary image TIA, TIB are further stored with being associated with the compressed character binary data.

When the compressed image data generation processing of S90 in FIG. 2 is over, the image processing of FIG. 2 is over. The generated highly compressed PDF file IF is output in a variety of forms, for example. For instance, the highly compressed PDF file IF is stored in the non-volatile storage device 230. Instead, the highly compressed PDF file IF may be transmitted to another terminal apparatus of the user. Also, the highly compressed PDF file IF may be output so that the scan image SI is to be displayed on the display unit 260 by using the highly compressed PDF file IF, or the highly compressed PDF file IF may be output so that it is transmitted to a printer and the scan image SI is printed by the printer.

According to the illustrative embodiment, the CPU 210 acquires the index value relating to the number of the plurality of character pixels in the scan image SI by using the character information Tx1, Tx2 including the character codes corresponding to the characters Ob1, Ob2 in the scan image SI. Specifically, the number NT2 of the character pixels in the corresponding regions CA1, CA2 in the reference image RI corresponding to the character regions TA1, TA2 in the scan image SI is acquired as the index value (S20, S44, S46 of FIG. 2). Then, the CPU 210 determines the extraction condition of the character pixels by using the index value (S35, S50 to S75 of FIG. 2). As a result, it is possible to extract the plurality of character pixels in the scan image SI with high precision.

In a case where the character codes and the like are not used, the information to be considered is not sufficient, so that the appropriate extraction condition may not be determined. For example, since a degree of non-uniformity of the colors of the characters in the scan image SI, the edge strengths of the characters and the like may be different depending on the images, it is relatively difficult to appropriately determine the extraction condition such as the extraction range. For example, in a case where the extraction range is excessively narrow, the number of the extracted character pixels is excessively small, so that a character expressed by the extracted character pixels may be blurred. Also, in a case where the extraction range is excessively wide, the number of the extracted character pixels extracted is excessively large, so that a character expressed by the extracted character pixels may be crushed. In either case, the readability and appearance of a character expressed by the extracted character pixels are deteriorated. In the illustrative embodiment, since the extraction condition of the character pixels is determined using the index value acquired using the character code, it is possible to extract the plurality of character pixels with high precision. As a result, it is possible to suppress the above problems, for example.

Also, in the above illustrative embodiment, since the CPU 210 is configured to determine the extraction condition of the character pixels by using the index value and the scan data, it is possible to extract the character pixels in the scan image SI with higher precision.

More specifically, the CPU 210 extracts the plurality of character pixels satisfying the default extraction condition by using the scan data, without using the index value (S35, S40 in FIG. 2). Then, the CPU 210 determines the extraction condition of the final character pixels by using the extraction result of the plurality of character pixels satisfying the default extraction condition (specifically, the number NT1 of the extracted character pixels) and the index value (specifically, the number NT2 of the character pixels in the corresponding region) (S50 to S75). As a result, it is possible to determine the more appropriate extraction condition of the character pixels. For example, even in a case where the default extraction condition is not appropriate, it is possible to determine the appropriate extraction condition of the character pixels.

Also, specifically, it can be said that the index value, specifically, the number NT2 of the character pixels in the corresponding region indicates the number NT2 of the character pixels which should be extracted in the character region of the processing target. In the above illustrative embodiment, the default extraction condition is adjusted so that the number NT1 of the character pixels in the character region satisfying the default extraction condition comes closer to the number NT2 of the character pixels indicated by the index value and should be extracted in the character region. Thereby, the extraction condition of the final character pixels is determined (S55 to S75 of FIG. 2). As a result, it is possible to determine the more appropriate extraction condition. For example, in a case where it is assumed that the number of the character pixels satisfying the default extraction condition is excessively large as compared to the index value, the default extraction condition is adjusted so that the number of the character pixels which should be extracted decreases (S64: NO, S75 in FIG. 2). Thereby, the extraction condition of the final character pixels is appropriately determined. On the other hand, in a case where it is assumed that the number of the character pixels satisfying the default extraction condition is excessively small as compared to the index value, the default extraction condition is adjusted so that the number of the character pixels which should be extracted increases (S64: YES, S70 in FIG. 2). Thereby, the extraction condition of the final character pixels is appropriately determined.

Also, as described above, the default extraction condition and the final extraction condition are conditions based on whether a pixel value is included in the extraction range. That is, the final extraction condition is a condition based on comparison of the first threshold value for defining the upper and lower limits of the extraction range and a pixel value. Also, the default extraction condition is a condition based on comparison of the second threshold value for defining the upper and lower limits of the extraction range and a pixel value. Therefore, it can be said that the adjustment of the extraction range (S70, S75) in the illustrative embodiment is to determine the first threshold value based on the second threshold value so that the number of the character pixels satisfying the final extraction condition comes closer to the number NT2 of the plurality of character pixels indicated by the index value and should be extracted than the number NT1 of the character pixels satisfying the default extraction condition. In this way, since the first threshold value of the final extraction condition is determined based on the second threshold value of the default extraction condition, it is possible to easily determine the final extraction condition as an appropriate value.

Also, the index value (specifically, the number NT2 of the character pixels in the corresponding region) is acquired without using the scan data (S20, S44, S46 in FIG. 2). As a result, it is possible to determine the extraction condition, by which the character pixels can be extracted with high precision, by using the index value relating to the number of the character pixels in the character region which is acquired without using the scan data.

More specifically, the CPU 210 generates the reference image data indicative of the reference image RI including the character image (specifically, the images in the corresponding region CA1, CA2 of FIG. 3B) corresponding to the character region by using the character code, without using the scan data (S20 in FIG. 2). Then, the CPU 210 acquires the index value in the character region by using the reference image data (S44, S46 in FIG. 2). As a result, it is possible to acquire the appropriate index value by using the reference image data.

Also, in a case where the absolute value of the difference ΔT is larger than the second reference value TH2, i.e., the number NT1 of the character pixels satisfying the default extraction condition and the number NT2 of the character pixels indicated by the index value and should be extracted differ by more than the second reference value TH2 (S60: NO in FIG. 2), the CPU 210 does not adjust the extraction condition in S70 or S75. Then, the CPU 210 extracts the character pixels satisfying the default extraction condition, as the final character pixels. As a result, in a case where the index value is not appropriate, it is possible to suppress the default extraction condition from being inappropriately adjusted. Therefore, it is possible to suppress the plurality of inappropriate character pixels from being extracted.

Also, in a case where the absolute value of the difference ΔT is equal to or smaller than the first reference value TH1, i.e., the number NT1 of the character pixels satisfying the default extraction condition and the number NT2 of the character pixels indicated by the index value and should be extracted differ by less than the first reference value TH1 (S55: NO in FIG. 2), the CPU 210 does not adjust the extraction condition in S70 or S75. Then, the CPU 210 extracts the character pixels satisfying the default extraction condition, as the final character pixels. As a result, in a case where it is appropriate that the default extraction condition is to be used, the default extraction condition is not adjusted, so that it is possible to extract the plurality of appropriate character pixels.

Also, the CPU 210 specifies one or more character regions in the scan image SI (S25 in FIG. 2), and executes the processing of S35 to S80 for each specified character region. That is, for each specified character region, the calculation of the index value (S46), the determination of the final extraction condition (S65 to S75) and the extraction of the character pixels (S80) are executed. As a result, since it is possible to appropriately extract the character pixels in each character region, it is possible to further improve the extraction precision of the character pixels.

As can be seen from the above descriptions, the default extraction condition used in S40 of the illustrative embodiment is an example of the second extraction condition, and the extraction condition used in S80 is an example of the first extraction condition. Also, the plurality of character pixels extracted in S40 is an example of the plurality of extraction pixels satisfying the second extraction condition, and the plurality of character pixels extracted in S80 is an example of the plurality of character pixels satisfying the first extraction condition. Also, the character regions TA1, TA2 in the scan image SI of the illustrative embodiment are examples of the specific region in the target image.

B. Modified Embodiments (1) In the above illustrative embodiment, the index value is the number NT2 of the character pixels in the corresponding region in the reference image RI. However, the index value is not limited thereto and may be any value relating to the number of the character pixels in the scan image SI. For example, the index value may be a value indicative of a level of the number of the character pixels in the corresponding region relative to an area of the corresponding region with a plurality of steps (for example, three steps). In this case, for example, in a case where a character indicated by the character code is a number or an alphabet, the CPU 210 may acquire an index value indicating that the number of the character pixels is relatively small, in a case where a character indicated by the character code is a Hiragana or Katakana, the CPU 210 may acquire an index value indicating that the number of the character pixels is a standard, and in a case where a character indicated by the character code is a Chinese character, the CPU 210 may acquire an index value indicating that the number of the character pixels is relatively large. In a case where the number NT1 of the character pixels satisfying the default extraction condition is smaller than the reference value even though the index value indicates that the number of the character pixels is relatively large, the CPU 210 may adjust the extraction condition so that the number of the character pixels satisfying the extraction condition increases. Also, in a case where the number NT1 of the character pixels satisfying the default extraction condition is larger than the reference value even though the index value indicates that the number of the character pixels is relatively small, the CPU 210 may adjust the extraction condition so that the number of the character pixels satisfying the extraction condition decreases.

(2) In the above illustrative embodiment, the character information includes the character code, the size information and the font information. However, the character information may include at least the character code, and the size information and the font information may be omitted. For example, it can be seen in the above modified embodiment (1) that the size information and the font information are not necessary so as to acquire the index value.

(3) In the above illustrative embodiment, the reference image data is generated using the character information, and the index value (specifically, the number NT2 of the character pixels in the corresponding region) is determined using the reference image data. Instead of this configuration, the index value may be determined using the character information, without generating the reference image data. For example, it can be seen in the modified embodiment (1) that it is not necessary to generate the reference image data so as to acquire the index value.

Also, the number of pixels in an image of the character indicated by each character code may be calculated in advance for each size of the character, and a database configured to store therein the number of pixels may be prepared in advance, for example. In this case, the CPU 210 may be configured to determine the number NT2 of the character pixels corresponding to the character code and the size of the character by referring to the database, without generating the reference image data. The database may be stored in the non-volatile storage device 230 of the calculation device 200 or in another calculation device such as a server configured to connect in communication with the calculation device 200.

Figure 8:
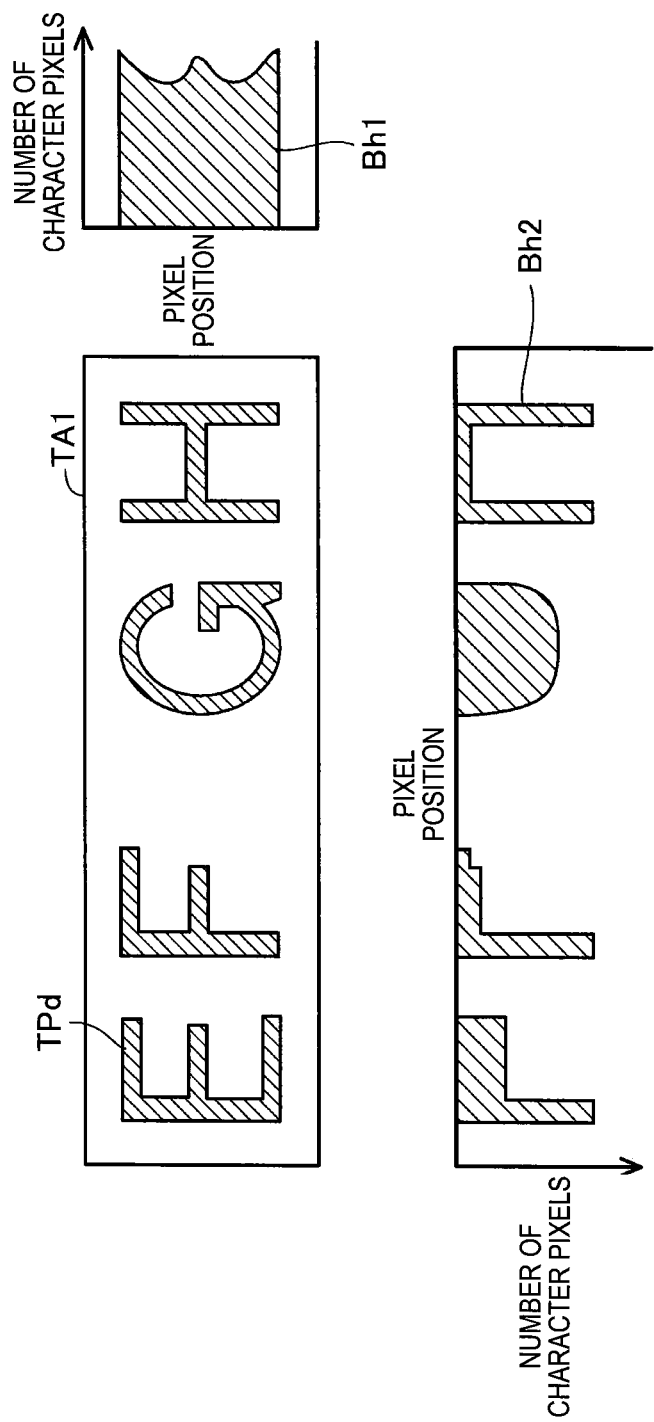
FIG. 8 depicts an example of a projection histogram of a character region TA1.

(4) Also, the index value may be a value that is to be calculated using a so-called projection histogram, for example FIG. 8 depicts an example of the projection histogram of the character region TA1. The CPU 210 is configured to generate the projection histogram of the character region of the processing target for the character pixels satisfying the default extraction condition, for example. For example, the plurality of pixels of the character region TA1 is classified into a plurality of classes based on vertical positions. In the illustrative embodiment, the plurality of pixels of which vertical positions are the same, i.e., the plurality of pixels on one pixel line extending horizontally is classified into one class. For example, in a case where a size of the character region TA1 is P pixels high×Q pixels wide, the plurality of pixels in the character region TA1 is classified into P classes, so that the number of pixels belonging to one class is Q. The CPU 210 is configured to count the number of the character pixels of Q pixels, which belongs to each class, for each of P classes, thereby preparing a vertical projection histogram Bh1 (FIG. 8). Likewise, the CPU 210 is configured to generate a horizontal projection histogram Bh2 (FIG. 8).

Likewise, the CPU 210 is configured to generate vertical and horizontal projection histograms for the corresponding region of the reference image RI (not shown). The CPU 210 is configured to calculate a feature value (for example, an area of the histogram or the like) relating to a shape of the projection histogram, as the index value. Then, the CPU is configured to determine whether the projection histogram of the corresponding region of the reference image RI and the projection histogram of the character region TA1 are similar to each other, based on the feature value relating to the shape of the projection histogram. In a case where the projection histograms are similar to each other, the CPU 210 does not adjust the default extraction condition. On the other hand, in a case where the projection histograms are not similar to each other, the CPU 210 adjusts the default extraction condition so that the projection histogram of the corresponding region of the reference image RI and the projection histogram of the character region TA1 are similar to each other, thereby determining the final extraction condition.

(5) In the above illustrative embodiment, the default extraction condition is set, and the final extraction condition is determined by adjusting the default extraction condition using the index value. Instead of this configuration, the final extraction condition may be determined using the index value, without setting the default extraction condition. For example, in many cases, the character pixel is generally a pixel of which brightness is relatively low, and the background pixel is a pixel of which brightness is relatively high. For this reason, in a case where the number NT2 of the character pixels in the corresponding region is acquired as the index value, the CPU 210 may determine the final extraction condition of the character pixels so that the first to NT2th pixels of the plurality of pixels in the character region of the processing target are to be extracted as the character pixels in ascending order of the brightness.

(6) In the above illustrative embodiment, the final extraction condition is determined using the scan data and the index value. Instead of this configuration, the final extraction condition may be determined using only the index value. For example, the CPU 210 is configured to calculate an average number of strokes of the characters, which are indicated by the character codes, by using the character codes, as the index value. In a case where the number of strokes is relatively large, the character is crushed, so that the appearance is likely to be lowered. Therefore, the CPU 210 determines as the final extraction condition an extraction condition using a relatively narrow extraction range so that the character is not to be crushed. In a case where the number of strokes is relatively small, the possibility that the character is to be crushed is low. Therefore, the CPU 210 determines as the final extraction condition an extraction condition using a relatively wide extraction range so that the character is not to be blurred.

(7) In the above illustrative embodiment, the index value is acquired and the extraction condition is determined for each character region. However, one index value may be acquired in the entire scan image SI, and one extraction condition may be determined in the entire scan image SI.

(8) In the above illustrative embodiment, regarding the extraction condition of the character pixels, the extraction range having two threshold values of upper and lower limits is used for one color component. However, an extraction range having only one threshold value may also be used. For example, for one color component, a range smaller than one threshold value may be used as the extraction range and a range equal to or larger than one threshold value may be used as the non-extraction range.

(9) In the above illustrative embodiment, the final extraction condition is determined by changing the extraction range of the default extraction condition. For example, the number of the character pixels which should be extracted may be increased by applying a so-called thickening filter configured to thicken a character in a binary image to a binary image including a plurality of character pixels satisfying the default extraction condition, instead of widening the extraction range. In this case, it can be said that a condition that pixels are to be obtained by subjecting the binary image including the plurality of character pixels satisfying the default extraction condition to the thickening filtering is the extraction condition of the final character pixels. Likewise, the number of the character pixels which should be extracted may be decreased by applying a so-called thinning filter configured to thin a character in a binary image to a binary image including a plurality of character pixels satisfying the default extraction condition, instead of narrowing the extraction range.

(10) In the above illustrative embodiment, the highly compressed PDF file is generated using the extraction result of the character pixels. Instead of this configuration, for example, the CPU 210 may be configured to generate an image file having another format such as XPS format. Also, the CPU 210 may be configured to generate an image file indicative of a corrected image, in which predetermined correction processing has been performed for characters specified by the extracted character pixels, by using the extraction result of the character pixels. The predetermined correction processing includes processing of correcting a color of the character to, an eye-friendly color, processing of emphasizing an edge of the character, and the like, for example.

(11) In the above illustrative embodiment, the target image data is the scan data. However, the disclosure is not limited thereto. For example, the target image data may be an image file (a PDF file or the like) that is to be generated by a document preparation application such as word processor software. In this case, in a case where the character information is added to a PDF file in advance, it is not necessary to execute the character identifying processing in the image processing of FIG. 2, and the CPU 210 may acquire the character information added to the PDF file in advance, in S15 of FIG. 2.

(12) In the above illustrative embodiment, the image processing of FIG. 2 that is to be executed by the calculation device 200 may be executed by an apparatus having an image reading unit such as the complex machine 400, the scanner 300 or the like, an apparatus having an optical image data generation unit such as a digital camera, or a server (not shown) capable of performing communication with the calculation device 200. For example, the complex machine or the scanner having the image processing function may be configured to execute the image processing for the scan data that is to be generated using the image reading unit thereof, to generate processed image data (for example, highly compressed PDF data), and to output the processed image data to the calculation device 200 connected in communication with the complex machine or the scanner. Also, the server having the image processing function may be configured to execute the image processing for the scan data that is to be acquired from the calculation device 200, the complex machine 400 or the scanner 300 through a network, to generate processed image data and to output the processed image data to the calculation device 200 through the network.

Generally speaking, the apparatus configured to implement the image processing function is not limited to the calculation device 200 and may be implemented by a complex machine, a digital camera, a scanner, a server or the like. Also, the image processing function may be implemented by one apparatus or a plurality of apparatuses connected through the network. In this case, a system including a plurality of apparatuses configured to implement the image processing function corresponds to the image processing apparatus.

(13) In the illustrative embodiment, a part of the configuration implemented by hardware may be replaced with software. To the contrary, a part of the configuration implemented by software may be replaced with hardware.

Although the disclosure has been described based on the illustrative embodiment and the modified embodiments, the embodiments are provided so as to easily understand the disclosure, not to limit the disclosure. The disclosure can be changed and improved without departing from the spirit of the disclosure and the claims, and the disclosure includes equivalents thereto.

What is claimed is:

1. An image processing apparatus comprising:
   a processor; and
   memory storing computer-readable instructions therein, the computer-readable instructions, when executed by the processor, causing the image processing apparatus to perform:
   acquiring target image data configured by a plurality of pixels and representing a target image including a character;
   acquiring a character code corresponding to the character in the target image, the character code being identification information allotted to characters so as to handle the characters in a computer;
   acquiring an index value by:
   generating reference image data indicative of a reference image by using the acquired character code, the reference image including a character represented by the acquired character code; and acquiring a number of character pixels configuring the character in the reference image by using the generated reference image data, the number of the character pixels configuring the character in the reference image being the index value;

determining a first extraction condition by using the index value;

extracting the plurality of character pixels satisfying the first extraction condition from the plurality of pixels in the target image; and generating an image file, which is indicative of the target image and includes processed character image data and processed background image data, by using character image data indicative of the plurality of extracted character pixels and background image data based on the target image data, the processed character image data being obtained by performing image processing to the character image data by a first image processing method, and the processed background image data being obtained by performing image processing to the background image data by a second image processing method different from the first image processing method.

2. The image processing apparatus according to claim 1, wherein the determining of the first extraction condition includes determining the first extraction condition by using the target image data and the index value.

3. The image processing apparatus according to claim 2, wherein the determining of the first extraction condition includes:

extracting a plurality of extraction pixels satisfying a second extraction condition by using the target image data, without using the index value; and determining the first extraction condition by using the index value and an extraction result of extracting the plurality of extraction pixels satisfying the second extraction condition.

4. The image processing apparatus according to claim 1, wherein the acquiring of the index value includes acquiring the number of the character pixels configuring the character in the reference image, without using the target image data.

5. The image processing apparatus according to claim 4, wherein the reference image corresponds to a specific region in the target image, and wherein the determining of the first extraction condition includes:

extracting a plurality of extraction pixels satisfying a second extraction condition by using the target image data, without using the index value; and determining the first extraction condition by adjusting the second extraction condition, the second extraction condition being adjusted so that the number of the character pixels configuring the character in the reference image is closer to a first number of the plurality of extraction pixels in the specific region and satisfying the second extraction condition after being adjusted than to a second number of the plurality of extraction pixels in the specific region and satisfying the second extraction condition before being adjusted.

6. The image processing apparatus according to claim 5, wherein the first extraction condition is a condition based on comparison of a first threshold value and a pixel value, wherein the second extraction condition is a condition based on comparison of a second threshold value and a pixel value, and wherein the determining of the first extraction condition includes determining the first threshold value based on the second threshold value so that the number of the character pixels configuring the character in the reference image is closer to the number of the plurality of character pixels satisfying the first extraction condition in the specific region than to the number of the plurality of extraction pixels satisfying the second extraction condition in the specific region.

7. The image processing apparatus according to claim 5, wherein the determining of the first extraction condition includes not adjusting the second extraction condition in a case where the number of the plurality of extraction pixels satisfying the second extraction condition in the specific region and the number of character pixels configuring the character in the reference image differ by more than a reference value, and wherein the computer-readable instructions, when executed by the processor, causing the image processing apparatus to further perform:

extracting the plurality of extraction pixels satisfying the second extraction condition as the plurality of character pixels in the case where the number of the plurality of extraction pixels satisfying the second extraction condition in the specific region and the number of character pixels configuring the character in the reference image differ by more than the reference value.

8. The image processing apparatus according to claim 4, wherein the reference image data is generated without using the target image data.

9. The image processing apparatus according to claim 1, wherein the computer-readable instructions, when executed by the processor, causing the image processing apparatus to further perform:

specifying one or more character regions in the target image, wherein the determining of the first extraction condition includes determining the first extraction condition by using the index value corresponding to the character region for each of the specified character regions, and wherein the extracting includes extracting the plurality of character pixels satisfying the first extraction condition for each of the specified character regions.

10. The image processing apparatus according to claim 1, wherein the computer-readable instructions, when executed by the processor, causing the image processing apparatus to further perform:

generating the background image data by using the character image data and the target image data.

11. The image processing apparatus according to claim 1, wherein the first image processing method is a first compressing method, and the second image processing method is a second compressing method different from the first compressing method.

12. The image processing apparatus according to claim 1, wherein the acquiring of the character code includes acquiring the character code by performing OCR processing to the target image.

13. An image processing method for controlling an image processing apparatus, the method comprising:

acquiring target image data configured by a plurality of pixels and representing a target image including a character;

acquiring a character code corresponding to the character in the target image, the character code being identification information allotted to characters so as to handle the characters in a computer;

acquiring an index value by:
- generating reference image data indicative of a reference image by using the acquired character code, the reference image including a character represented by the acquired character code; and
- acquiring a number of character pixels configuring the character in the reference image by using the generated reference image data, the number of the character pixels configuring the character in the reference image being the index value;

determining a first extraction condition by using the index value;

extracting the plurality of character pixels satisfying the first extraction condition from the plurality of pixels in the target image; and generating an image file, which is indicative of the target image and includes processed character image data and processed background image data, by using character image data indicative of the plurality of extracted character pixels and background image data, the processed character image data being obtained by performing image processing to the character image data by a first image processing method, and the processed background image data being obtained by performing image processing to the background image data by a second image processing method different from the first image processing method.

14. The image processing method according to claim 13, wherein the acquiring of the character code includes acquiring the character code by performing OCR processing to the target image.

15. A non-transitory computer readable storage medium storing a program, when executed by a computer of an image processing apparatus, causing the image processing apparatus to perform operations comprising:

acquiring target image data configured by a plurality of pixels and representing a target image including a character;

acquiring a character code corresponding to the character in the target image, the character code being identification information allotted to characters so as to handle the characters in a computer;

acquiring an index value relating to a number of a plurality of character pixels configuring the character in the target image by:
- generating reference image data indicative of a reference image by using the acquired character code, the reference image including a character represented by the acquired character code; and
- acquiring a number of character pixels configuring the character in the reference image by using the generated reference image data, the number of the character pixels configuring the character in the reference image being the index value;

determining a first extraction condition by using the index value;

extracting the plurality of character pixels satisfying the first extraction condition from the plurality of pixels in the target image; and generating an image file, which is indicative of the target image and includes processed character image data and processed background image data, by using character image data indicative of the plurality of extracted character pixels and background image data, the processed character image data being obtained by performing image processing to the character image data by a first image processing method, and the processed background image data being obtained by performing image processing to the background image data by a second image processing method different from the first image processing method.

16. The non-transitory computer readable storage medium according to claim 15, wherein the acquiring of the character code includes acquiring the character code by performing OCR processing to the target image.

* * * * *